United States Patent [19]
Law et al.

[11] Patent Number: 5,789,043
[45] Date of Patent: Aug. 4, 1998

[54] DECORATIVE SCENE SUPPORT AND WREATH INSERT

[75] Inventors: Jeremy Law, Englewood; Donna Waldman, Denver, both of Colo.

[73] Assignee: HolidayCreations, Inc., Littleton, Colo.

[21] Appl. No.: 760,926

[22] Filed: Dec. 6, 1996

[51] Int. Cl.$^6$ ................................................ A47G 33/00
[52] U.S. Cl. ................................ 428/10; 156/63; 493/958
[58] Field of Search ........................ 428/10, 7; 156/63; 493/958

[56] References Cited

U.S. PATENT DOCUMENTS

| | | | |
|---|---|---|---|
| D. 84,281 | 6/1931 | Frei, Jr. | D11/120 |
| D. 84,282 | 6/1931 | Frei, Jr. | D11/120 |
| D. 168,961 | 3/1953 | Melaragno | 428/10 X |
| D. 206,124 | 11/1966 | Burnbaum | D11/120 |
| D. 236,903 | 9/1975 | Martindale et al. | D11/120 |
| 1,853,305 | 4/1932 | Frei, Jr. | 428/10 |
| 2,033,173 | 3/1936 | Barocas | 428/10 X |
| 5,037,679 | 8/1991 | Noble, Jr. | 428/10 |
| 5,554,420 | 9/1996 | Noble, Jr. | 428/10 |

OTHER PUBLICATIONS

Article; Crafts Magazine; "Friendly Fall Wallhangings"; Oct. 1987; p. 96.

*Primary Examiner*—Henry F. Epstein
*Attorney, Agent, or Firm*—John R. Ley; Timothy B. Scull

[57] ABSTRACT

An ornament display device and wreath insert is inserted into the center of a wreath and provides a flat surface for displaying objects. The display device comprises a plurality of prongs each having at least one serration, with each prong adapted to contact the wreath core and establish an interference fit sufficient to hold the support in position without tipping around the core. A platform of a predetermined configuration, e.g., concave shaped ends, helps to secure the platform within the center of a wreath. A placard displays a message or other decorative graphic and is shaped to substantially hide the platform and the prongs.

20 Claims, 4 Drawing Sheets

DECORATIVE SCENE SUPPORT AND WREATH INSERT

This invention relates to holiday ornamentation. More particularly, the present invention relates to an ornamental wreath insert that can be securely placed in the center of a wreath. More particularly still, the present invention relates to an ornamental wreath insert that can also be displayed on a flat surface.

BACKGROUND OF THE INVENTION

Decorations are an important aspect of celebrating many events and holidays. Typical holiday decorations range from colored flags and bows to pictures and figurines representing characters associated with holiday folklore. Christmas is a particular holiday that has been responsible for the production and sale of many such decorations. Around the Christmas holiday, it is common to see houses, trees and store fronts decorated with lights and other ornaments. Decorative pine and holly wreaths are especially popular accessories around the Christmas holiday.

Wreaths are circular decorations having a center opening. Wreaths generally have a core that forms the substantially circular shape. Although Christmas wreaths are commonly made of pine boughs or holly, wreaths have been constructed from many other materials such as straw, candy, firs and chile peppers. The type of wreath core typically depends on the type of wreath. For example, a candy wreath may use a polystyrene core and a fir wreath may use a wire frame. Pine wreaths typically have a wire frame or a core consisting of the pine branches. To form a core of pine branches, the pine boughs are either twisted or woven together and the two ends are joined to make the circular wreath. This method avoids the use of a wire frame and has branches as the core of the wreath.

Similar to a traditional Christmas pine tree, pine wreaths are often trimmed with Christmas lights or other ornaments. Ornaments are either hung from the wreath's sprigs or attached to the core of the wreath. For added decoration, a larger ornament or figurine may be placed in the center of the wreath.

Generally however one cannot simply place the larger ornament in the center opening. Placing the ornament in the center is difficult because the support surface provided by the pine boughs is uneven or flexible. With no flat surface to place an ornament, the ornament is typically in a slanted condition. The slanted condition is particularly unacceptable with ornaments designed to stand upright such as figurines. Moreover, the uneven surface causes instability which increases the risk of the ornament falling from its position in the wreath.

Typically, correcting or stabilizing the center ornament involves attaching the ornament to the wreath. One method of attachment includes wiring the ornament to the wreath core. First, the ornament must be attached to the wire. This step poses problems for the ornaments without convenient appendages that can be used to attach the wire. Next, the wire is attached to the core. To provide sufficient stability it becomes important to get the wire attached to the core and not to the more frail sprigs that surround the core. This step can be extremely difficult, especially when the wreath core is located deep within pine needles. Even when the ornament is wired to the core, the ornament still may not be level and/or stable since the wiring may not fully compensate for the uneven surface.

One variation of the wiring method involves wiring the ornament to a small stake or insert which is then placed in the wreath branches. Using a stake alleviates the problems associated with getting the wire around the core. However, the stakes usually cannot be placed firmly in the wreath and thus, the stakes usually fail to provide the stability that is necessary to display larger, heavier objects. Further, the problems associated with attaching the wire between the ornament and the stake still remain.

Another solution entails the construction of a permanent flat surface into the frame of the wreath. This method may be unsatisfactory because it excludes the ability to display ornaments in most existing wreaths that are not built in this fashion, and requires some form of display on the flat surface whether the user desires it or not. Furthermore, the permanently attached flat surface is only available for wreaths that use a structural frame, not for wreaths that comprise a core of branches.

It is with respect to these and other factors that the present invention has evolved.

SUMMARY OF THE INVENTION

One aspect of the present invention relates to an ornament display device that can be inserted into the center of a wreath and provides a flat surface for displaying objects. Another aspect of the invention relates to effectively supporting a holiday scene or objects from a wreath in a secure manner and which allows removal of the objects or scenery if desired. Another aspect of the invention involves selectively displaying a holiday scene or objects from a wide variety of wreaths of different constructions. Still another aspect of the present invention relates to a holiday wreath insert which may also be used independently of a wreath to display a holiday scene.

In accordance with these aspects, the present invention relates to a decorative scene support which is adapted to allow an ornament to be securely supported on and from a core, such as the core of a wreath. The decorative scene support comprises a plurality of prongs. Each prong comprises at least one serration adapted to contact opposite sides of the core and establish an interference fit sufficient to hold the support in position without tipping around the core, but yet allow the support to be removed if desired. The plurality of prongs of the decorative scene support comprise pairs of prongs where the serrations of each prong oppose the serrations of one other prong. Typically, the prongs are adapted to contact a wreath core formed primarily of branches, but the arrangement of the prongs allows the support to be used with a wide variety of different constructions including both foam and wire cores.

In accordance with other aspects, the decorative scene support is adapted to securely support an ornament while resting on a horizontal surface, such as a table top, window sill or mantle.

In accordance with other aspects of the present invention, the decorative scene support further comprises a platform which is connected to the prongs and is adapted to support the ornament. Preferably, the platform is planar and, along with the prongs, helps to locate the platform in the center of the wreath. The predetermined platform configuration preferably includes concave shaped lateral ends to secure the platform within the center of a wreath.

In accordance with its preferred aspects, a placard is adapted to display a message or other decorative graphic. The placard is attached to the platform and is shaped to substantially hide the platform and the prongs, when in the wreath or on a horizontal support.

3

Figure 1:
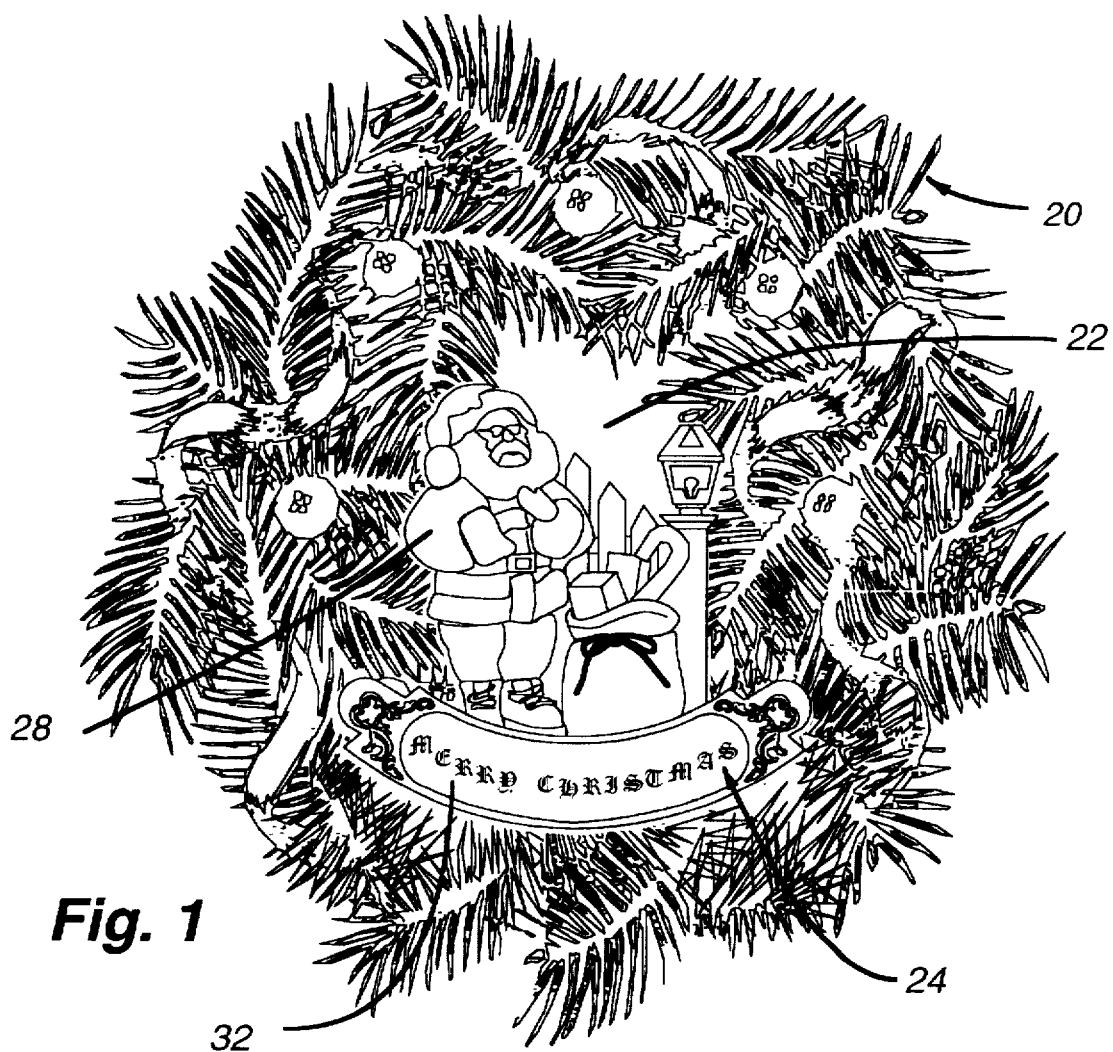
FIG. 1 is a perspective view of a wreath insert of the present invention supporting a holiday decoration and placed within a pine wreath.
Figure 2:
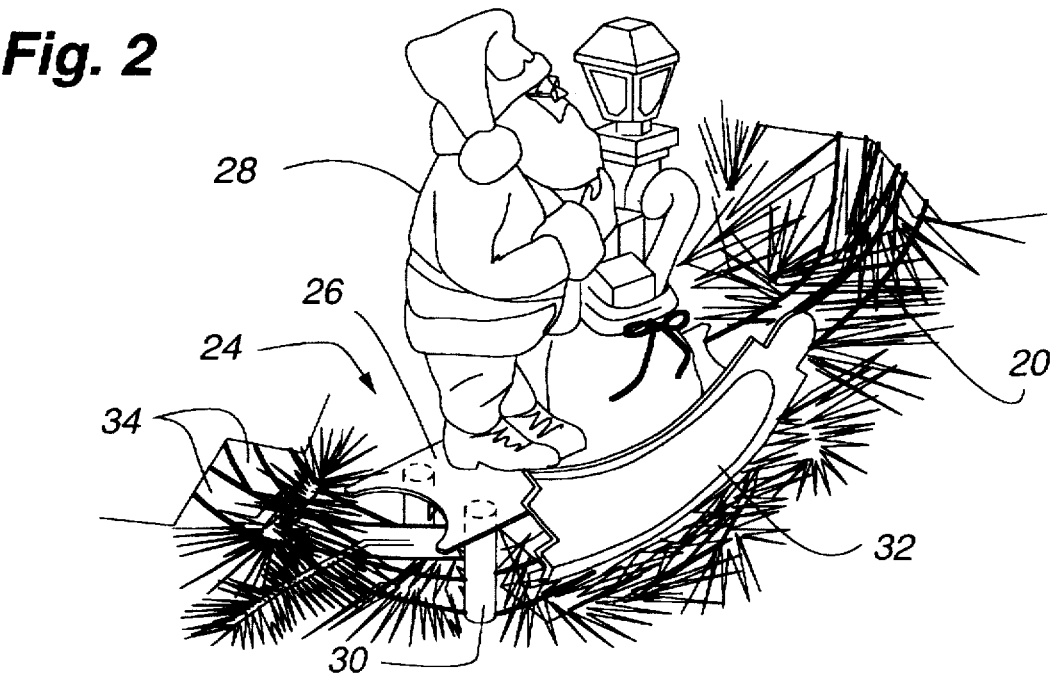

FIG. 2 is a view of the wreath insert shown in FIG. 1 from a different perspective and of a portion of the pine wreath also shown in FIG. 1.

Figure 3:
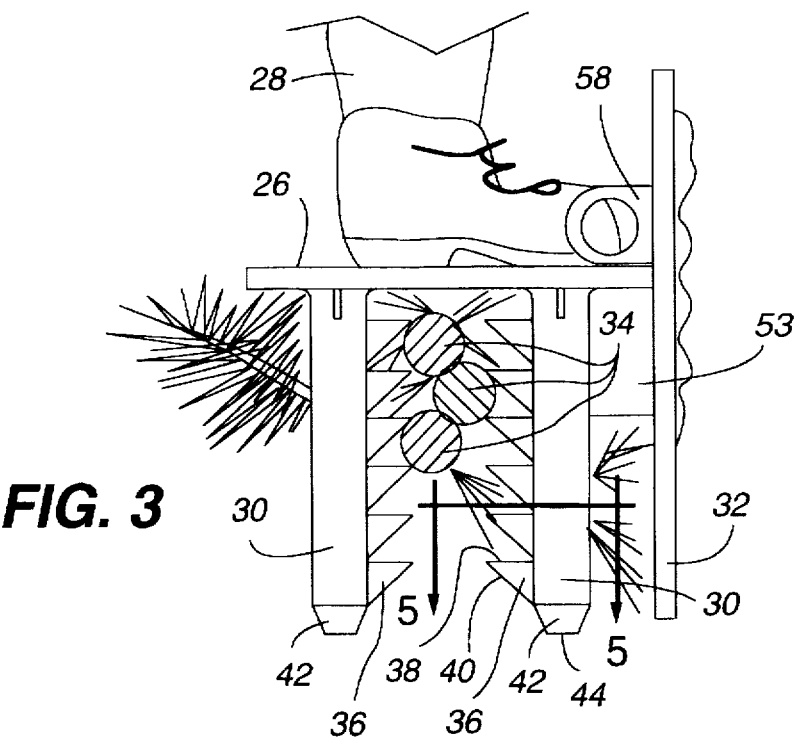

FIG. 3 is an enlarged side elevational view of the wreath insert and a cross-sectional view of the pine wreath shown in FIGS. 1 and 2.

Figure 4:
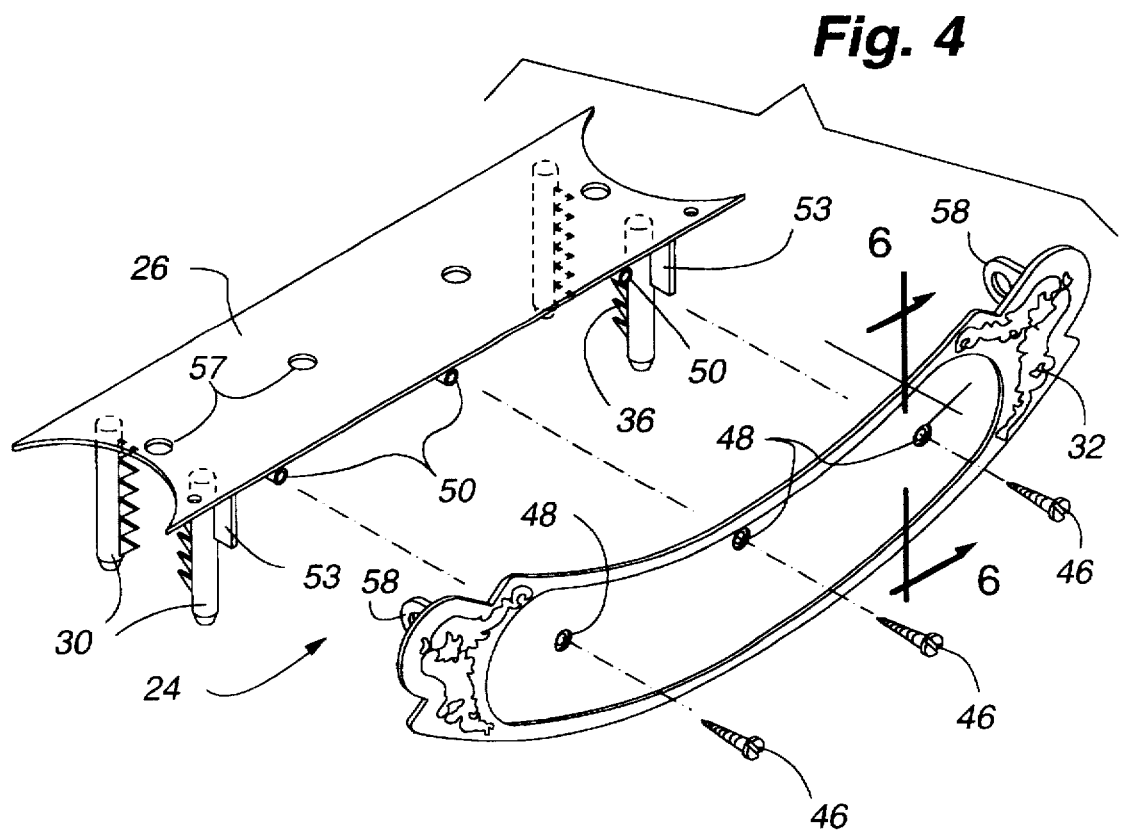

FIG. 4 is an exploded, perspective view of the wreath insert shown in FIGS. 1, 2 and 3.

Figure 5:
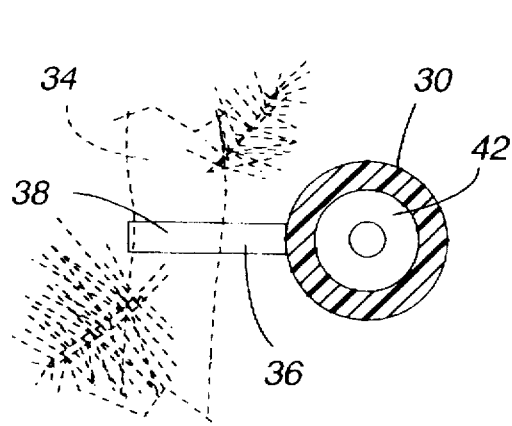

FIG. 5 is a cross-sectional, top view of a portion of the wreath insert taken substantially along the line 5—5 in FIG. 3.

Figure 6:
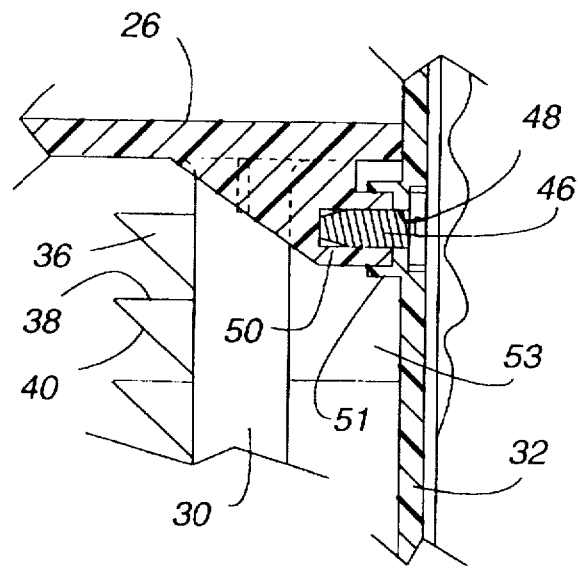

FIG. 6 is an enlarged cross-sectional view of a portion of the wreath insert taken substantially along the line 6—6 in FIG. 4.

Figure 7:
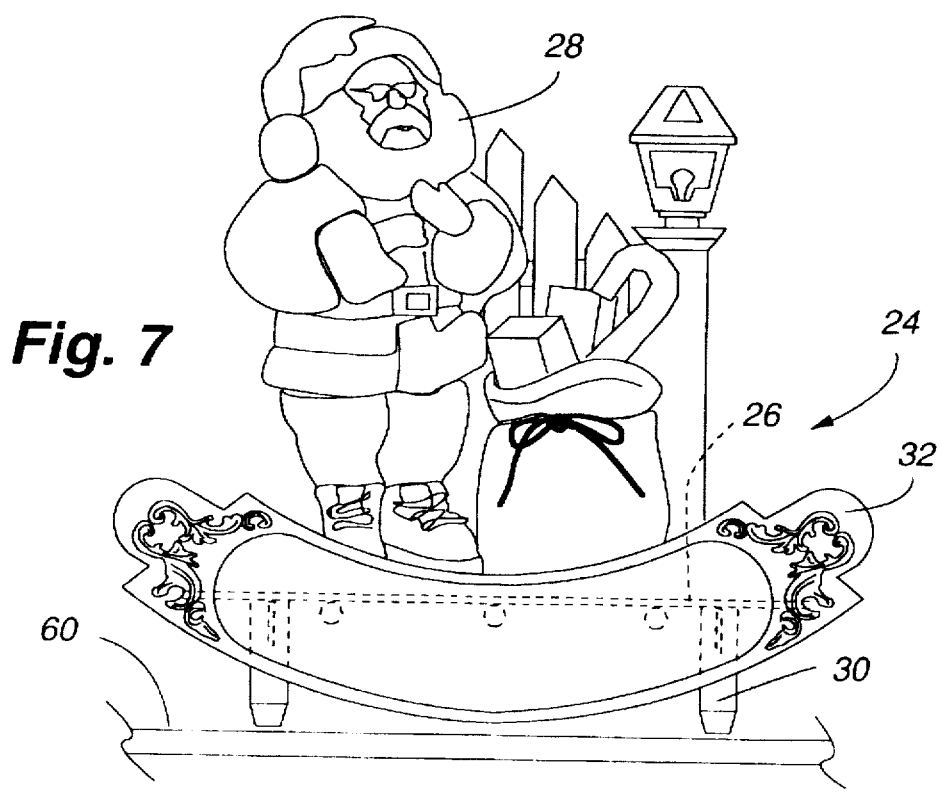

FIG. 7 is a front view of the insert shown in FIGS. 1 and 2, alternatively shown as supporting a holiday scene from a rigid horizontal surface.

FIGS. 8–12 are perspective views of other embodiments of decorative scene supports and wreath inserts embodying the present invention.

DETAILED DESCRIPTION

A wreath 20 having a center opening 22 which receives a wreath insert 24 of the present invention is shown in FIG. 1. The wreath insert 24 is adapted to connect securely and conveniently to a core of the wreath 20 and fit in the center opening 22 of the wreath 20. The wreath insert 24 is used to display an ornamental, decorative object or scene 28.

The wreath insert 24 comprises a platform 26 which is adapted to provide a flat supporting surface for the decorative object or scene 28 as is shown in FIGS. 2–4. The decorative object 28 can be simply placed at rest on the platform 26 or the object 28 may be permanently attached to the platform 26. Examples of the decorative object 28 include framed photographs, candles, nativity scenes, or figurines such as a Santa Claus shown in FIGS. 1 and 2. In short, the scene or object 28 could be almost anything that fits in the center opening 22 of the wreath 20.

The wreath insert 24 comprises legs or prongs 30 which are attached and extend downwardly from the platform 26 into the wreath 20 as is shown in FIGS. 2 and 3. The prongs 30 provide support and stability for the platform 26 and thus for the decorative object 28. The insert 24 also comprises a vertically oriented placard 32 which is attached to the front of the platform 26. The placard 32 substantially hides the platform 26 and prongs 30, and the placard 32 is also available to display a seasonal greeting, message or other pictorial scenery. The placard 32 is preferably curved to generally comply with the shape of the wreath.

The prongs 30 extend downwardly away from the platform 26 and on opposite sides of the thicker branches 34 that form the core of the wreath 20 as is shown in FIGS. 2 and 3. Preferably, the prongs 30 are sufficiently long to extend deep into the wreath 20 a sufficient distance to contact the core branches 34. Extending the prongs 30 to the core of the wreath 20 provides better support because the stronger, thicker branches provide more stability for the platform 26. The length of the prongs 30 and the substantial contact with the core branches prevents the platform 26 and scene 28 from tipping forward or backward and assuming an awkward or undesired position.

In the preferred embodiment, the prongs 30 are located in pairs as is shown in FIG. 3. Each pair of prongs 30 provide resistance or interference to the platform 26 turning around the core. The tighter the branches 34 fit between the prongs

4

30, the greater the frictional resistance or interference. As the frictional or interference component increases, the prongs 30 become less likely to slide and therefore the insert 24 becomes less likely to rotate and is therefore more stable.

In order to provide a more secure frictional and interference fit, the prongs 30 include serrations or teeth 36. The teeth 36 create greater interference with the core branches 34 and sprigs that extend from them, and therefore increases the frictional and interference with the wreath 20. The teeth 36 are shaped so that each tooth 36 has two sides: a horizontal side 38 and an angled side 40, as shown in FIGS. 3, 5 and 6. The horizontal side 38 of each tooth 36 extends substantially parallel with the platform 26. The angled side 40 of each tooth 36 is angled with respect the platform 26. The angled side 40 of each tooth 36 extends upward and away from each prong, toward the teeth 36 of the other prong of each pair of prongs 30 which face one another. Positioning the angled side 40 away from the platform 26 allows prongs 30 to more easily slide down between the core branches 34 when the insert 20 is initially placed into the wreath 20. Also, the horizontal side 38 increases the resistance necessary to remove the insert 24 from the core and therefore decreases the possibility of the insert 24 from twisting around the core or sliding out of the wreath 20. As is shown in FIG. 3, the core branches 34 can be positioned between the prongs 30 in such a way so they cannot readily slide out. Further, some of the branches may be wedged between the teeth 36 to increase the friction and to produce an interference fit which enhances the stability required for displaying larger, heavier ornaments 28. However, the friction and interference fit is not so great to prevent the intentional separation of the insert from the wreath core, if and when the user desires to do so.

To ease the placement of the insert into the wreath 20, the prongs 30 have tapered lower ends 42 as is shown in FIG. 3. The tapered ends 42 help prevent flush contact between the bottom edge 44 of the prongs 30 and branches 34 which might make inserting the prongs 30 into the wreath more difficult. The prongs 30 are preferably hollow, as shown in FIG. 5.

The placard 32 is connected to the front of the platform 26 as is shown in FIGS. 4 and 6. The attached placard 32 hides the platform 26 and prongs 30 from view and provides a space to display a decorative, seasonal message or graphic, if desired. In the particular embodiment shown in FIG. 4, three screws 46 are used to attach the placard 32 to the platform 26. The screws 46 are placed through screw holes 48 in the placard 32 and into threaded eyelets 50 located on the bottom of the platform 26. Circumferential shoulders 51 are formed on the rear surface of the placard 32 to surround the eyelets 50 and to assist holding the placard 32 securely in place. The placard 32 can be painted or a decal (not shown) could be affixed to its front surface, either of which serves to cover or hide the screws 46 from view. The screws 26, holes 48, eyelets 50 and shoulders 51 are examples of a variety of different means to connect the placard 32 to the platform 26.

To prevent the placard from pivoting about a vertical plane located at the front surface of the platform 26, the insert 24 comprises two vertical shoulders 53 as shown in FIGS. 3, 4 and 6. The shoulders 53 extend downwardly from the platform 26 and substantially occupy the area between the prong 30 and the front area of the platform 26 where the placard 32 is attached. The shoulders 53 provide support to the back of the placard 32 to help prevent the placard 32 from rotating under the platform 26.

As is shown in FIGS. 2 and 4, the platform 26 comprises concave shaped lateral ends 55. The ends 55 are indented inwardly into the platform 26 and are shaped to conform with the generally-rounded exterior of the wreath. The concave shaped ends 55 also act to help secure insert 24 in the center 22 of the wreath 20 and prevent the insert from pivoting around the core. Therefore the concave shape of the ends 55 increases the contact surface area between the wreath 20 and the platform 26. The increased contact surface area helps secure the platform 26 and the insert 24 within the wreath 20.

The platform 26 may also contain slots or holes 57 as shown in FIG. 4. Since wreaths are often hung on doors that swing open and are slammed shut, the ornament 28 may be optionally attached to the platform 26 by fasteners through the holes 57. For example, the ornament 28 may have pegs integrally attached to its lower end (not shown). The pegs could then be placed within the holes 57 provided in the platform 26. As another example, the holes 57 could be used to wire the ornament 28 to the platform 26. Screws (also not shown) could extend through the holes 57 to the bottom of the ornament 28 to hold the ornament 28 to the platform 26. Of course, the ornament 28 could also be attached to the platform 26 with an adhesive.

Another aspect of the present invention involves the use of the insert 24 as a support, such as display piece, table center piece or as a mantle ornament, apart from a wreath. The insert 24 can be placed on a support surface 60, such as a table, window sill or mantle, as shown in FIG. 7. The insert could be surrounded by or placed over pine boughs, because of the extension of the prongs 30 above the support surface. The placard 32 substantially hides the platform 26 and the prongs 30. The prongs 30 of the insert 24 have flat bottom edges 44 (FIG. 3) enabling the insert to stand freely on the table 52. Additionally, the use of three or more prongs 30, located in a separated relationship from each other, also allows for the insert 24 to stand on its own. Preferably, the insert 24 has two pairs of prongs 30 set near the ends of the platform 26 for enhancing both its free-standing capabilities and its frictional, interference fit capabilities with respect to the core of the wreath.

The placard 32 has eyelets 58 (FIG. 4) found at its ends. The eyelets 58 are useful for attaching the items to the inserts 24, such as ornamental balls or the like. The eyelets 58 could also be used to help secure the insert 24 to the wreath 20, if desired, by ties for example. The eyelets 58 could be used to attach the wreath to adjacent stationary objects when the insert 24 is positioned on a stationary surface 60. As a last example, the insert 24 might be suspended by attachments extending from the eyelets 58.

Figure 8:
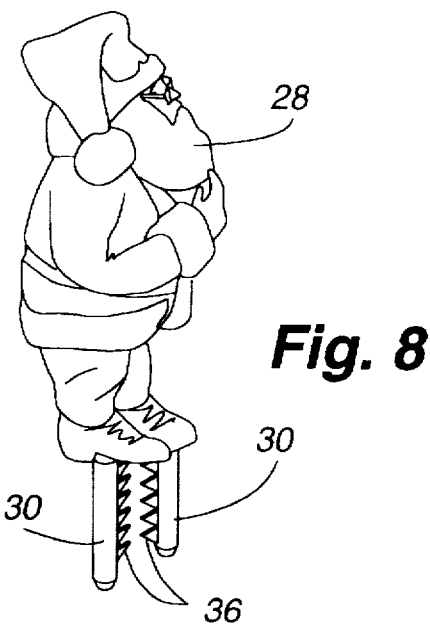
Figure 9:
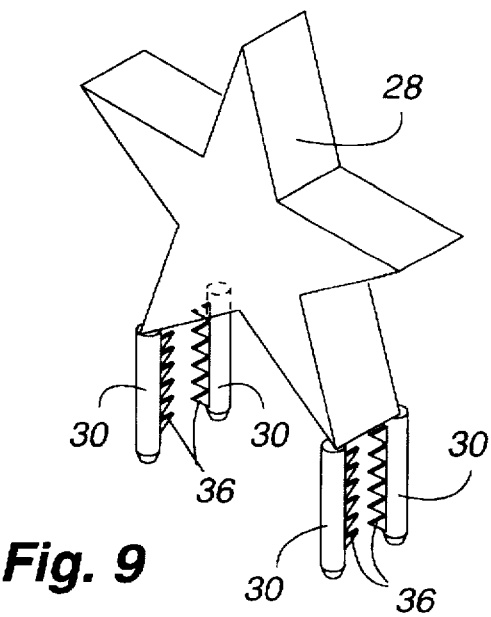

In another embodiment of the present invention, the prongs 30 are attached directly to the display object 28 as shown in FIGS. 8 and 9. The prongs 30 may be either an integral part of the ornament 28 or they may be subsequently attached to the ornament 28 using adhesive or some other fastener. Directly attaching the prongs 30 to the lower portion of the display object 28 eliminates the need for the platform 26. The prongs 30 extend downwardly from the ornament 28 and into pine branches (not shown) in a similar manner as the insert 24. The prongs 30 also comprise the teeth 36 to increase the frictional, interference fit available from the prongs 30 contacting the branches. Increasing the frictional component helps stabilize the ornament 28 within the branches.

The particular embodiment shown in FIG. 8, however, is limited in stability on a branch, because it compares only the single pair of prongs. If the ornament shown in FIG. 8 is light in weight, the two prongs 30 may provide sufficient stability within the branches. However, if the ornament 28 shown in FIG. 8 is heavy, then the two prongs 30 may not be sufficient to prevent forward or backward tipping and further stabilizing (i.e., another prong 30) may be required. Also, attaching only two prongs 30 to the ornament 28 is only beneficial for displaying the ornament within the wreath or branches since two prongs themselves probably would not enable the ornament to stand alone. On the other hand, the orientation of the horizontal surfaces 38 of the teeth may provide sufficient friction and interference to enable a light-weight ornament to be suspended below a branch. In this case, the prongs 30 would be inserted upwardly from the bottom of and on each side of a single branch or a collection of sprigs. Once inserted around the branches or sprigs, the frictional, interference fit is sufficient to support the light-weight ornament 28 from below.

Figure 10:
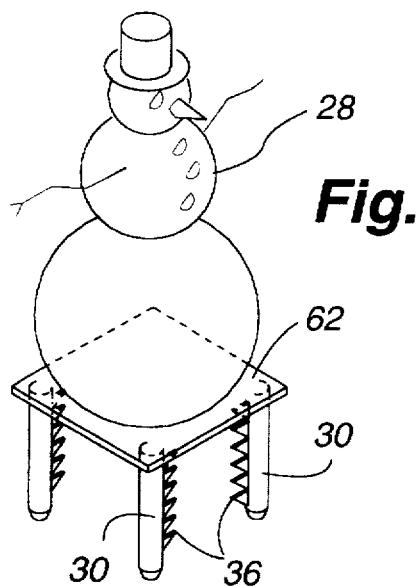

Depending on the shape of the ornament, attaching the prongs 30 directly to the ornament 28 may not be possible. Therefore, an alternative smaller platform 62 may be used as is shown in FIG. 10. The platform 62 performs in substantially the same function as the platform 26 of the insert 24 shown in FIGS. 1–7. In the embodiment shown in FIG. 10, the ornament 28 is attached to the platform 62, and the prongs 30 extend downwardly from the platform 62. The prongs 30 have the teeth 36 that provide the frictional component that prevents the platform 62 and ornament 28 from tipping.

Figure 11:
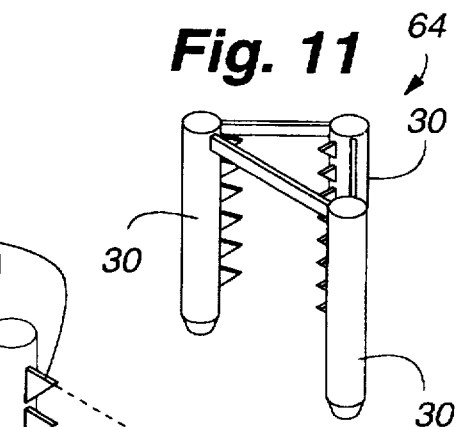
Figure 12:
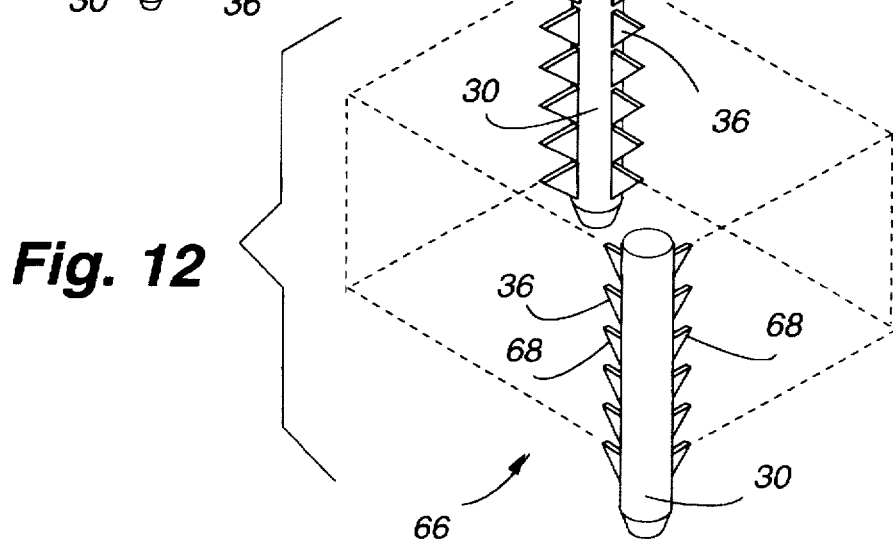

FIGS. 11 and 12 illustrate other embodiments or configurations for the prongs 30 which could be used with any of the embodiments of the present invention. In one configuration 64, three prongs 30 could replace the pairs of prongs 30. When three prongs 30 are used in the configuration 64, it is preferable to have the teeth 36 point towards the general direction of the other two prongs 30 as shown in FIG. 11 for stability and rigidity. Using three prongs 30 instead of a pair increases the number of teeth 36 coming in contact with branches (not shown) and therefore helps increase the frictional interference fit created by the prongs 30, thereby increasing stability. Also, the third prong substantially may prevent the insert 24 from tipping in a manner that could not be prevented by only a pair of prongs.

In another configuration 66, the prongs 30 have two or more rows 68 of teeth 36 as shown in FIG. 12. The rows of teeth 36 point away from the center of the prong 30 and are positioned on the prong at approximately right angles to each other, and the teeth 68 extend at approximately a 45 degree angle from a line directly between the two prongs 30. Further, the rows of teeth 36 on the opposing prong 30 point in the general direction of the other prong 30. These relationships are shown by the dashed lines in FIG. 12. Orienting the teeth 36 in this manner allows the teeth 36 to work together to increase the frictional interference fit.

The wreath insert 24 provides the flat platform 26 for the ornament to be placed within the wreath 20. The insert 24 is securely set in the wreath 20 providing stability for the ornament 28. The insert 24 also has a placard 32 to hide the platform 26 and to provide further decoration. The use of the teeth 36 on the prongs 30 creates an effective frictional and interference connection of the insert 24 or an ornament 28 to a branch or a support surface.

Presently preferred embodiments of the present invention and many of its improvements have been described with a degree of particularity. It should be understood that this description is of preferred examples for implementing the invention, and the scope of the invention should not necessarily be limited by this description. The scope of the present invention is defined by the following claims.

What is claimed is:

1. A decorative scene support adapted to allow an ornament to be securely supported on and from a core which is part of a wreath that has a center opening, the core surrounding the center opening, said support comprising:

a plurality of spaced-apart prongs adapted to extend on opposite sides of the core, each prong having at least one serration adapted to contact a side of the core and establish an interference fit sufficient to hold the support in position within the center opening without tipping around the core.

2. A decorative scene support as defined in claim 1 wherein the serrations of one prong are adapted to oppose the serrations of at least one other prong.

3. A decorative scene support as defined in claim 1 wherein the plurality of prongs comprises at least one pair of prongs, and the serrations of each prong of the pair substantially oppose the serrations of the other prong of the pair.

4. A decorative scene support as defined in claim 1 wherein the core is formed by branches combined to form the wreath.

5. A decorative scene support as defined in claim 1 wherein the plurality of prongs is three, and the serration of each prong faces toward the other two prongs.

6. A decorative scene support as defined in claim 1 wherein the plurality of prongs forms a pair of prongs, each prong includes two rows of a plurality of serrations, the two rows of serrations of each prong face the other prong and extend at a predetermined angle relative to a reference extending directly between the two prongs of the pair.

7. A decorative scene support as defined in claim 6 wherein the predetermined angle is approximately 45 degrees.

8. A decorative scene support as defined in claim 1 wherein the serration is a part of a row of teeth.

9. A decorative scene support as defined in claim 8 wherein a plurality of rows of teeth are formed on each prong.

10. A decorative scene support adapted to be securely supported on and from a core which is part of a wreath that has a center opening, the core surrounding the center opening, comprising:

a horizontal platform adapted to allow an ornament to be securely supported thereon; and a plurality of prongs extending downward from the platform, the prongs are adapted to extend on opposite sides of the core and establish a frictional restraint against the core on opposite sides of the core sufficient to hold the platform in position within the center opening of the wreath, and the prongs are also adapted alternatively to contact a horizontal surface and support the platform from the horizontal surface.

11. A decorative scene support as defined in claim 10 wherein the platform is generally planar.

12. A decorative scene support as defined in claim 11 wherein the platform further comprises two lateral opposite ends, each end having a concave shape, the concave shape contacting a surface of the core when the platform is positioned in the center opening of the wreath.

13. A decorative scene support as defined in claim 10 wherein the support further comprises:

a placard attached to the platform, the placard extending vertically with respect to the platform and substantially hiding the platform and the prongs, the placard adapted to display a message or other graphic.

14. A wreath insert for decorating a wreath having a center opening surrounded by a core of the wreath, the wreath insert adapted to fit securely to the core of the wreath and within the center opening to display an ornament, said wreath insert comprising:

a platform having an upper surface upon which to support the ornament;

at least one pair of elongated prongs, each prong having a proximal and a distal end, the proximal end of each prong attached to the platform and the distal end of each prong adapted to extend away from the platform, the prongs of each pair are adapted to contact opposite sides of the core and establish an interference fit sufficient to hold the platform in position inside the opening with the prongs extending outward from the opening on a front and a back of the core to resist tipping of the platform around the core.

15. A wreath insert as defined in claim 14 wherein the platform has opposite ends and the ends of the platform have a predetermined configuration to contact the core and locate the platform in the center of the wreath and to prevent tipping of the platform around the core.

16. A wreath insert as defined in claim 15 wherein the predetermined configuration of the ends of the platform are concavely shaped.

17. A wreath insert as defined in claim 16 wherein the insert further comprises a placard attached to the platform.

18. A wreath insert as defined in claim 14 wherein the prongs further include a plurality of serrations which contact the core.

19. A wreath ornament as defined in claim 18 wherein the serrations of each prong are adapted to oppose the serrations of the other prong of the pair.

20. A wreath insert as defined in claim 18 wherein the distal end of each prong is tapered.

* * * * *